United States Patent [19]

Ishikawa et al.

[11] Patent Number: 4,887,105
[45] Date of Patent: Dec. 12, 1989

[54] DATA INPUT/OUTPUT DEVICE FOR A CAMERA

[75] Inventors: Norio Ishikawa, Osaka; Toshihiko Ishimura, Habikino, both of Japan

[73] Assignee: Minolta Camera Kabushiki Kaisha, Osaka, Japan

[21] Appl. No.: 243,174

[22] Filed: Sep. 8, 1988

Related U.S. Application Data

[63] Continuation of Ser. No. 127,556, Dec. 1, 1987, abandoned, which is a continuation of Ser. No. 53,553, May 21, 1987, abandoned, which is a continuation of Ser. No. 881,280, Jul. 2, 1986, abandoned.

[30] Foreign Application Priority Data

Jul. 4, 1985 [JP] Japan .................. 60-147215

[51] Int. Cl.$^4$ .................. G03B 7/24; G03B 17/18
[52] U.S. Cl. .................. 354/21; 354/412; 354/289.1
[58] Field of Search ............ 354/21, 410, 412, 289.12, 354/289.1, 354; 73/5

[56] References Cited

U.S. PATENT DOCUMENTS 4,423,934  1/1984  Lambeth et al. .................. 354/412
4,629,304  12/1986  Saegusa .................. 354/289.12
4,692,005  9/1987  Takami .................. 354/21

FOREIGN PATENT DOCUMENTS

113215  6/1985  Japan .................. 73/5

Primary Examiner—W. B. Perkey
Attorney, Agent, or Firm—Watson, Cole, Grindle & Watson

[57] ABSTRACT

A camera is provided with a camera data input/output device which operates selectively to read the film data of a film cartridge and to receive and output the camera checking data through a group of terminals provided in a film chamber accommodating the film cartridge and a part of an external device detachably attached to the camera body. In response to a control signal input from the external device, the camera checking data are exchanged between the camera body and the external device, and the film data are received with the film cartridge loaded in the film chamber.

3 Claims, 9 Drawing Sheets

DATA INPUT/OUTPUT DEVICE FOR A CAMERA

This is a continuation of Ser. No. 127,556, filed 12/01/87, which is a continuation of Ser. No. 053,553, filed 5/21/87, which is a continuation of Ser. No. 881,280, filed 7/02/86, all now abandoned.

BACKGROUND OF THE INVENTION

1. Field of the Invention

The present invention relates to a camera within which a large amount of data are processed for the control of light measurement, exposure calculation, automatic exposure control operation, automatic focusing, film feeding and so forth, and more particularly it pertains to a camera which can be checked efficiently upon assembly or repair of the camera as to whether it functions normally.

2. Description of the Prior Art

To enable the desired camera operations in accordance with a large amount of data, a one-chip microcomputer is generally employed which incorporates ROM and RAM circuits for control of the camera operation. In such a case, the camera operation may be checked with a particular input terminal of the microcomputer chip being set to a particular state. Microcomputers generally incorporate a specific program which operates only when a particular input terminal of the chip of the microcomputer is set to a particular state. The specific program causes the data written in the ROM of the microcomputer to be output serially from an output terminal, and enables the access of the RAM data from the exterior of the microcomputer. Whether the microcomputer and/or the electric device provided with the microcomputer operate properly or not, can be checked with data read from the exterior of the microcomputer. The operation of the microcomputer may be checked in other ways as well. For example, the specific program mentioned above may affect independently a particular part of the flow of the regular camera operation or may cause generation of data instantaneously from a particular output terminal, thereby affecting regular operation.

Those methods of checking the camera or microcomputer operation require that a particular input terminal of the microcomputer be set to a particular state. However, to prevent accidental data setting, the particular terminal is not exposed on the outside surface of the camera. Thus the operational check can be made only when the camera cover is open—to allow setting of the microcomputer through its terminal—i.e., when the camera is being assembled or has been disassembled. In such a condition, the mechanical parts that supply data to the microcomputer or the mechanical parts controlled by the data output from the microcomputer cannot be said necessarily to operate in the same manner as they would with the camera in the fully assembled condition. The operating condition might change as a result of the assembling or disassembling of the camera. Accordingly, the conventional checking methods, do not allow the proper conditions for the operational check.

It should be noted that, although the disadvantages of the prior art have been described with reference to a one chip microcomputer as an example for the sake of a simple explanation,, the same can be said for the case wherein the operational check is made for an IC other than the microcomputer but which controls the camera operation according to a large amount of data.

SUMMARY OF THE INVENTION

An object of the present invention is to provide a camera in which its operation can be checked at its fully or substantially fully assembled or completed condition.

Another object of the present invention is to provide a camera checking device which checks the camera operation through a group of terminals for camera accessories The present invention is characterized by a film data-bearing device having so-called DX code patterns on a film cartridge and an external device for checking the camera operation that is connected to the camera circuit through a group of terminals which are provided in the film supply chamber of a camera body in order to read electrically the data included in the film data bearing device of the film cartridge. The camera is provided with an input/output circuit which operates selectively to receive the film data and to receive and output the camera checking data. When a film cartridge is loaded in the film chamber, the input/output circuit is set to read the film speed data, e.g., the DX data recorded on the external surface of the film cartridge. When the external device for checking the camera operation is coupled to the film chamber, the input/output circuit is switched such that the camera checking data are exchanged between the external device and the camera body through the group of terminals.

According to the present invention, the transmission of the camera operation checking data as well as the reading of the film data are made through the group of terminals provided in the film supply chamber of the camera body so that the camera need not be disassembled and reassembled to check the operation of the cam especially in circuits including a microcomputer. Additionally, as the camera can be checked in its fully or substantially fully assembled condition, the operating condition is not changed by the disassembling and reassembling of the camera as was required by the conventional device. Although the film data reading terminals generally are used only upon the loading of film, the present invention presents another use for them so that the terminals are used efficiently and extra camera terminals are not required.

Other objects and advantages of the invention will become apparent during the following discussion of the accompanying drawings.

BRIEF DESCRIPTION OF THE DRAWINGS

FIGS. 10-A and 10-B are block diagrams showing circuit arrangements of other embodiments.

DETAILED DESCRIPTION OF THE PREFERRED EMBODIMENTS

Figure 1:
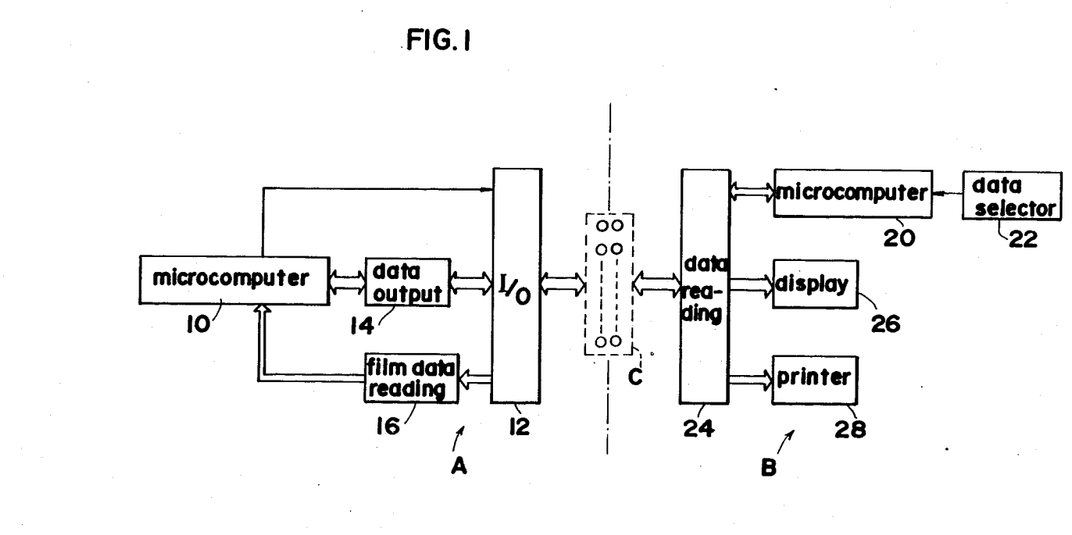
FIG. 1 is a block diagram showing the circuit arrangement of an embodiment of the present invention.

FIG. 1 is a block diagram showing the arrangement of an embodiment according to the present invention. With reference to the Figure, a data input/output device A of a camera body is shown on the left side of the broken line. On the right side of the broken line is shown an external, instrument B which is attached to the camera body during the assembly, adjustment and repair of the camera and reads various data from the camera body to check whether or not the camera body is functioning normally. The data input/output device A and the external instrument B are connected electrically with each other via a group of terminals C through which the desired data is exchanged. In the present embodiment, the group of terminals C are arranged on a wall of the film supply chamber of the camera body to serve as DX terminals, i.e., film data reading terminals. The data input/output device A serves to read the film data from a film cartridge loaded in the chamber and to receive and output the camera data with the external instruments attached thereto. The external instrument B is provided with a part which is contoured to fit in the film supply chamber.

In the data input/output device A, a microcomputer 10 includes a CPU, a RAM, and a ROM, and controls the film data reading operation and the camera data outputting operation. An input/output section 12 (hereinafter referred to as the I/O section) is a circuit that can be switched selectively to receive the film data from the film cartridge and to output camera data to the external instrument B. Control signals from the microcomputer 10 control the switching operation of the I/O section 12. A data output section 14 and a film data reading section 16 are arranged between the microcomputer 14 and the I/O section 12 and are adapted to store momentarily the camera data to be transmitted to the external instrument B and the film data read in the I/O section from the film cartridge.

In the external instrument B, a microcomputer 20 controls the operation for reading the camera data transmitted from the camera body. A data selector section 22 is operated manually to select one kind of data in the case when the camera data includes many different types of data, such as exposure control data and focus detection data. In this case, the microcomputer 20 responds to the manual operation of the data selector section 22 to output data designating the type of the data, the output data being supplied through a data reading section 24 to the data I/O device A in the camera body. The microcomputer 10 of the data I/O device A outputs camera data to the external instrument B in compliance with the designation data. The data reading section 24 temporarily stores the camera data that have been transmitted from the camera body. The microcomputer 20 displays the camera data read in the data reading section 24 with a display section 26, and records the same via a printer 28. The displayed or recorded data indicates whether or not the camera body is operating normally.

Figure 2:
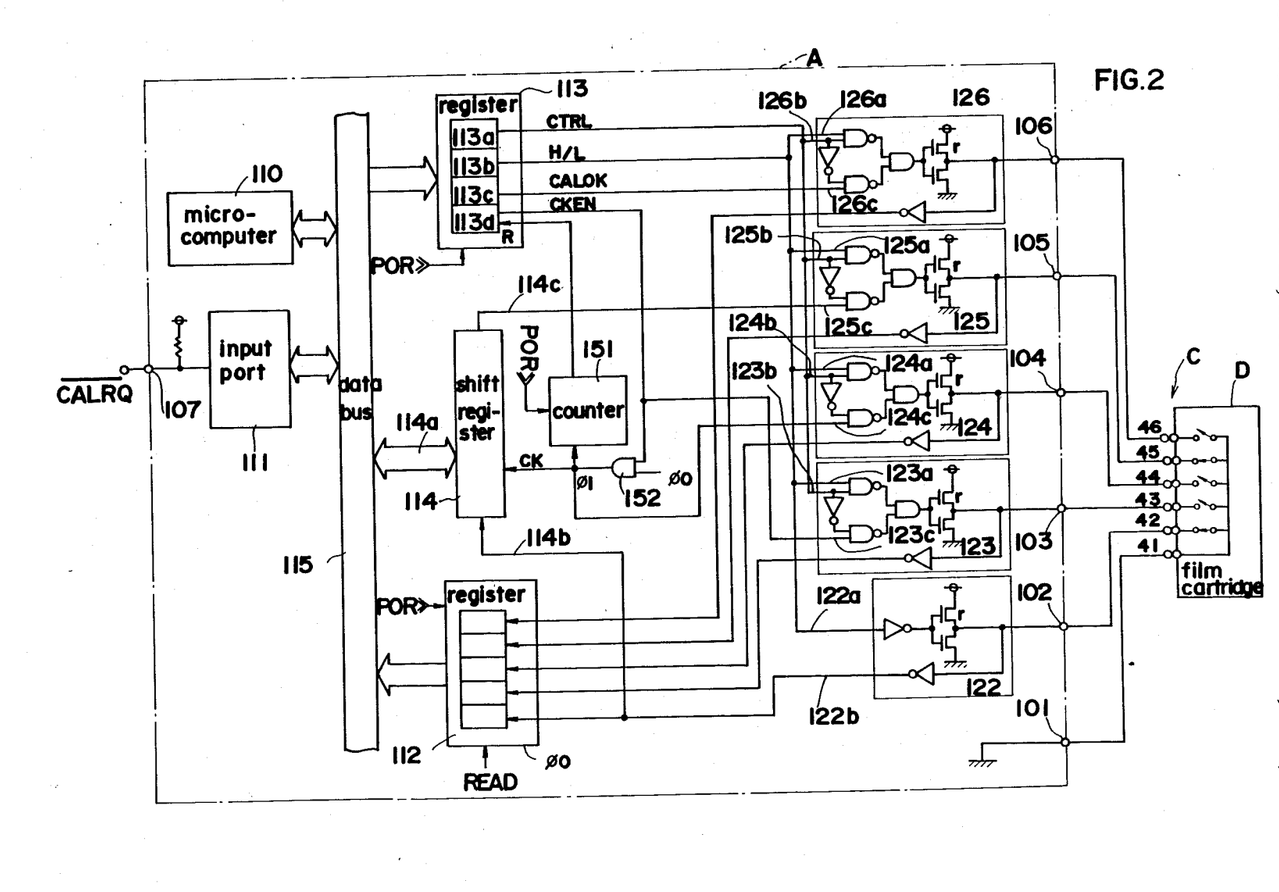
FIGS. 2 and 3 are circuit diagrams showing respectively detailed circuits of the blocks A and B in FIG. 1.

FIG. 2 shows a definite arrangement of the data I/O device A in FIG. 1. In the Figure, the film data bearing contacts, the so-called DX code patterns, on a film cartridge are connected electrically with the group of terminals C in place of the external instrument B. With reference to FIG. 2, the group of terminals or DX terminal section includes six DX terminals 41 through 46 of which the terminal 41 is a common ground terminal. The data I/O device A is provided with seven terminals 101 through 107, of which terminals 101 through 106 are connected respectively with the DX terminals 41 through 46 mentioned above. The terminal 107 is normally driven to a high level but is driven to a low level for the transmission of the camera data to the external instrument B. The low level signal is applied through an input port 111 and a data bus 115 to the microcomputer 110 to initiate the camera data transmitting checking operation.

Input/output (hereinafter referred to as I/O) circuits 123 through 126, corresponding to the I/O section in FIG. 1, are provided for each of the terminals 102 through 106. The I/O circuits 103 through 106 are composed respectively of two NAND gates, a single AND gate, two inverters and a C-MOS, and have the same circuit construction. The remaining I/O circuit 122 is composed of two inverters and a single C-MOS. The above mentioned C-MOSs are designed to have a comparatively high turning-on resistance on the P-channel FET, e.g., 50 k$\Omega$ to 100 k$\Omega$. Accordingly, those C-MOSs function as pull-up resistors of a high resistance when low level signals are applied thereto, and as switching elements to fix their corresponding terminals 102 through 106 at low levels when high level signals are applied thereto.

A register 112, corresponding to the film data reading section 16 in FIG. 1, stores the five-bit DX data read through the terminals 102 to 106 and the I/O circuits 122 to 126. A register 113 stores the four-bit control data fed from the microcomputer 110. The terminal 113a for the first bit of the control data commonly is connected to the input terminals 123a through 126a of the I/O circuits 123 through 126. The terminal 113b for the second bit of the control data commonly is connected to the input terminals 122b through 126b of the I/O circuits 122 through 126. The terminal 113c for the third bit is connected to the input terminal 126c of the I/O circuit 126. The terminal 113d for the fourth bit is connected to the input terminal 123c of the I/O circuit 123 and to one input terminal of an AND gate 152 mentioned below. The state of each bit is determined in accordance with what input/output operation is effected in each I/O circuit.

An eight-bit shift register 114, an octal counter 151 and the AND gate 152 together correspond to the data output section 14 in FIG. 1. Data to be output to the external instrument B are written in the form of eight-bit data into the parallel I/O terminal 114a of the shift register 114 from the microcomputer 110 via the data bus 115. The serial input terminal 114b of the shift register 114 is connected to the output terminal 122b of the I/O circuit 122. The serial output terminal 144c of the shift register 114 is connected to the input terminal 125c of the I/O circuit 125. The other input terminal of the AND gate 152 receives standard clock pulses $\phi 0$ and the output of the AND gate 152 is connected to the input terminal 124c of the I/O circuit 124 and the respective clock input terminals of the shift register 114 and the counter 151. The output terminal of the counter 151 is connected to the reset terminal of the fourth bit 113d of the control data register 113. The data of the counter 151 and the registers 112 and 113 are reset in response to power supplied from a power source (not shown).

The circuit operation of the data I/O device A of the above described arrangement is explained below. First, the case wherein a film cartridge D has been loaded into the film supply chamber of the camera body is discussed. The microcomputer 110 supplies to the register 113 data for reading the DX data so that both the first and second bits 113a and 113b of the register 113 are set to "1". As a result, all the inputs of the C-MOSs of the I/O circuits 122 through 126 are set at low levels so that all the C-MOSs function as pull-up resistors. Accordingly, high or low level signals are generated at the terminals 102 through 106 in accordance with the DX code patterns formed on the film cartridge D. The DX code data are read through inverters in the register 112. The read data are captured by the microcomputer 110 at predetermined timings and used for light measurement and/or exposure calculation.

The following explanation concerns the case where the external instrument B is coupled to the film supply chamber. It is assumed that data transmitted to the external instrument B have been read in the shift register 114 in the form of eight-bit data. First, the microcomputer 110 sets "0" at the first and fourth bits 113a and 113d of the register 113. As a result, the input of the C-MOS of the I/O circuit 123 is set at a high level in order to fix the potential at the terminal 103 at a low level. Subsequently, when the level of the fourth bit 113d is switched from "0" to "1", the potential at the terminal 103 changes from a low to a high level. This level change enables the external instrument B to read the data. At the same time, the AND gate 152 is opened so that clock pulses $\phi 1$ are supplied to the counter 151, shift register 114 and I/O circuit 124. Accordingly, synchronous clock pulses SCK for data inputting and outputting are supplied from the terminal 104 to the external instrument B. In synchronization with the clock pulses, data are input in single bit increments from the external instrument B through the terminal 102 to the camera body. Then, also in synchronization with the clock pulses $\phi 1$, the shift register 114 reads bit-by-bit the data of the external instrument B that are input to the input terminal 114b. At the same time, synchronous with the clock pulses $\phi$-1, the shift register 114 outputs the stored camera data in single bit increments from the output terminal 114c through the I/O circuit 125 and the terminal 105 to the external instrument B.

The counter 151 counts the clock pulses $\phi$-1 and changes its output from a high to a low level when the counted number reaches "8". In this state, the fourth bit 113d of the register 113 is reset to "0" to block the AND gate 152 so that the supply of clock pulses $\phi$-1 is stopped, thereby stopping the serial data exchange.

By that time the eight-bit data of the external instrument B have been read in the shift register 114 and at the same time the eight-bit data of the camera body that were stored in the shift register 114 have been transmitted to the external instrument B. The change of the output signal of the counter 151 from a high to a low level serves as an interrupt-requiring signal from which the microcomputer 110 detects the completion of the serial data exchange and reads the eight-bit data from the parallel I/O terminal 114a of the shift register 114 via the data bus 115. Thus, the eight-bit serial data exchange is completed.

Figure 3:
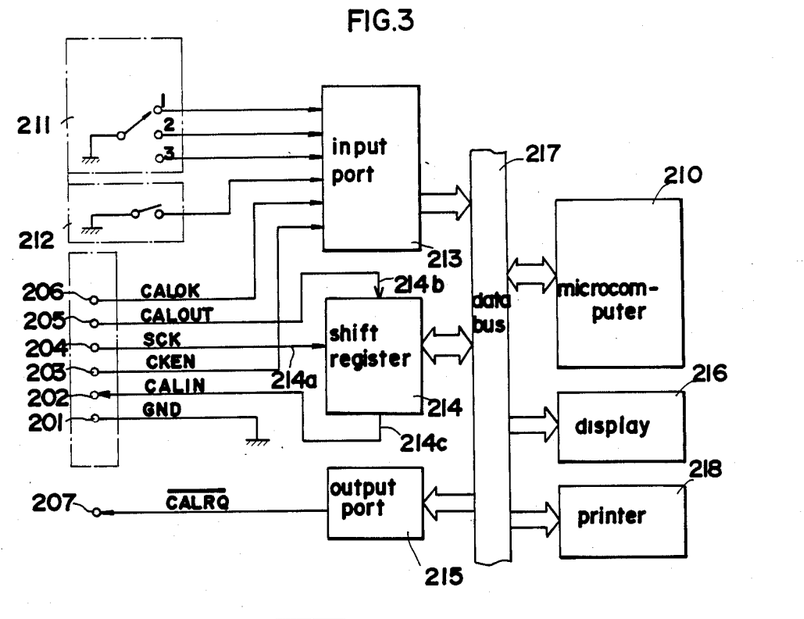

FIG. 3 is a block diagram showing the construction of the external instrument B. With reference to FIG. 3, the terminals 201 through 206 and the terminal 207 correspond respectively to the terminals 101 through 106 and terminal 107 of the data I/O device A in FIG. 2. A selector switch 211, corresponding to the data selector section 22 in FIG. 1, is set to a position in accordance with the type of data to be read from the camera. The data indicating the type of data to be transmitted, in compliance with the position of the switch 211, is supplied through an input port 213 and a data bus 217 to the microcomputer 210. A normally open switch 212 is closed to initiate the data reading operation and its operation signal is also supplied through the input port 213 and the data bus 217 to the microcomputer 210. From the output port 215, a signal $\overline{CALRQ}$, depending on the opening or closing of the start switch 212, is output and is applied through a terminal 207 to the terminal 107 of the data I/O device A in the camera body. The output port 215 has the form of an open collector or open drain, and the transistor at its output stage is conductive when the switch 212 is closed, and non-conductive when the switch is open.

An eight-bit shift register 214 and the input port 213 together correspond to the data reading portion 24 in FIG. 1, and the shift register 214 has its clock input terminal 214a connected to a terminal 204, its serial data input terminal 214b connected to a terminal 205, and its serial data output terminal 214c connected to a terminal 202. With those arrangements, the data fed from the data I/O device A are supplied through the terminal 205, the shift register 214 and the data bus 217 to the microcomputer 210. The data indicating the type of data to be transmitted, depending on the position of the selector switch 211, is output from the microcomputer 210 through the data bus 217, the shift register 214 and the terminal 202 to the camera body.

Figure 4:
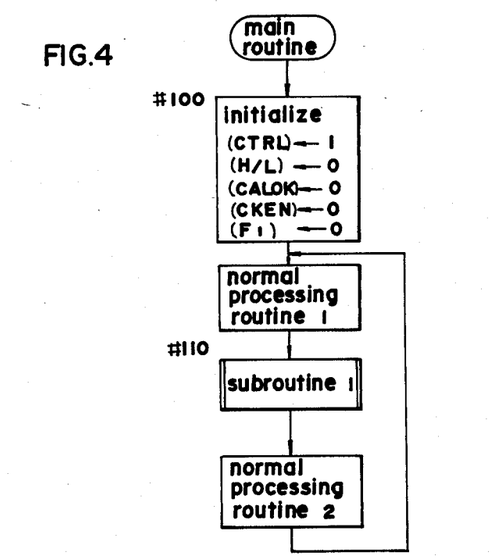
FIGS. 4 through 6 are flow charts showing the operation of the microcomputer 110 shown in FIG. 2.
Figure 5:
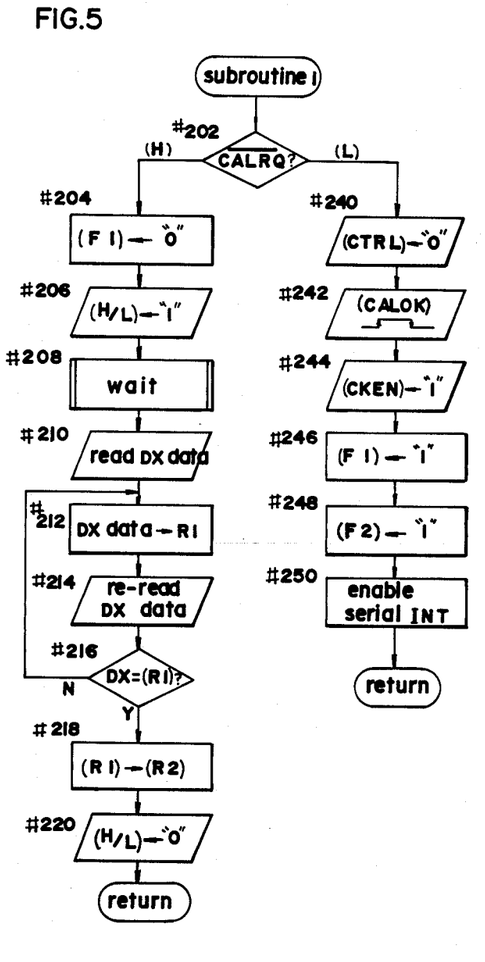
Figure 6:
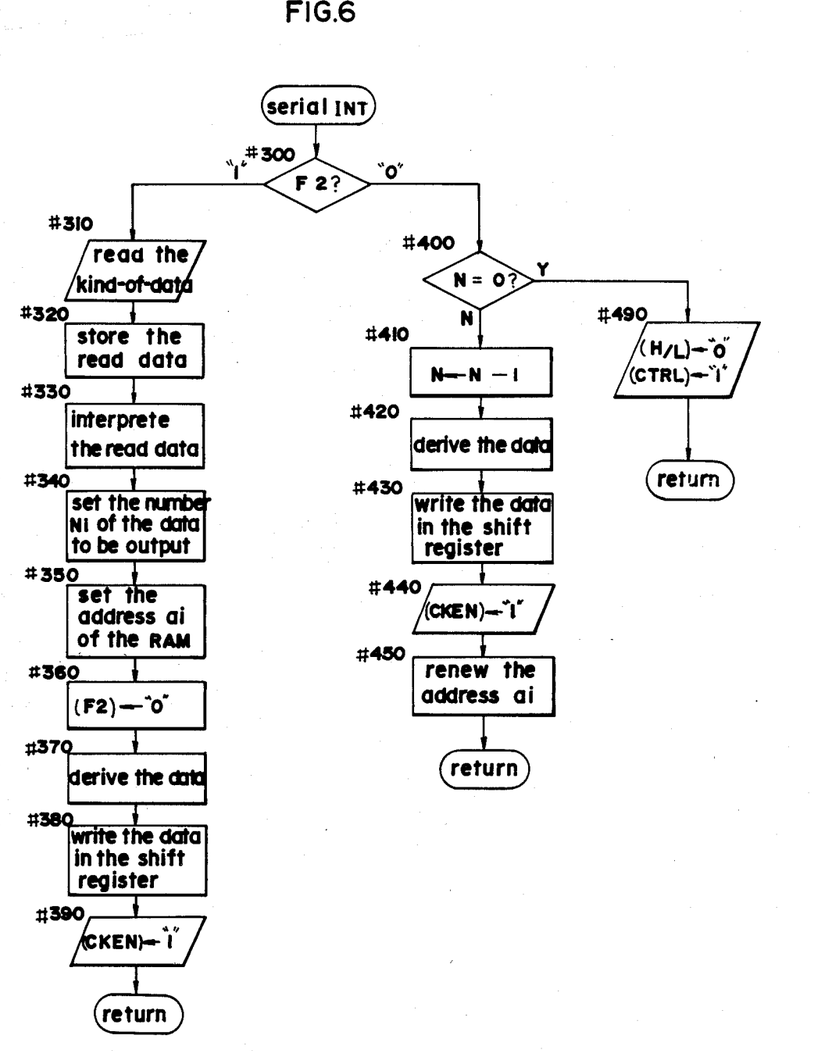
Figure 7:
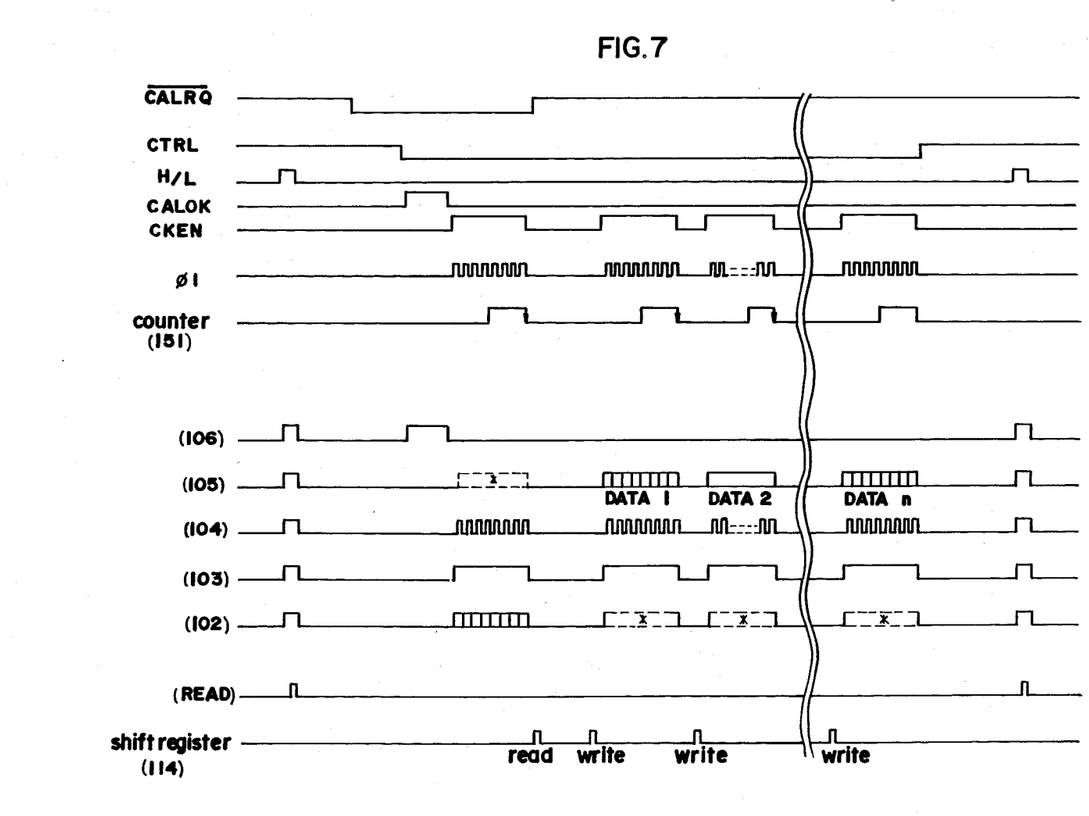
FIG. 7 is a time chart showing the operation of the various portions of the circuit shown in FIG. 2.

FIGS. 4 through 6 are flow charts showing an example of the operation of the microcomputer 110 in the data I/O device A in the camera body, while FIG. 7 is a time chart showing the data exchange between the data I/O device A and the external instrument B. When power from the power source (not shown) is initiated, the microcomputer 110, the registers 112 and 113 and the counter 115 are reset to the power-on condition so that the microcomputer 110 starts the operation of the main routine as shown in FIG. 4. In the main routine, each bit of the control register 113 and the operational condition memory flags are initialized at step #100 so that the bits 113a, 113b, 113c and 113d of the register 113 are set respectively at "1", "0", "0" and "0" and the flags F1 and F2 are set to "0". The initialization of the bits 113a through 113d of the register 113 fixes the potentials at terminals 102 through 106 at low levels to prevent current leakage through the DX cord pattern portion on the film cartridge to the ground terminal 101. At the same time, the AND gate 152 is blocked to prevent the supply of the standard clock pulses to the shift register 114 and the counter 151.

Immediately after the initialization or termination of a predetermined operation, the microcomputer 110 jumps to a subroutine 1 shown in FIG. 5 (step #110). The subroutine 1 is for selecting the control data for either the DX data reading or the camera data supply. With reference to FIG. 5, the microcomputer 110 detects the input level at the terminal 107 (step #202). If the potential at the terminal 107 is high, the microcomputer 110 enters the condition for the DX data reading operation and proceeds to the program flow beginning at step #204. If the potential is low, the microcomputer 110 enters the condition for the camera data supplying operation and jumps to the program flow beginning at step #240. When the potential at the terminal 107 is high, "0" is written for the flag F1 to store in memory the condition for the DX data reading operation (step #204). Then, "1" is written in the register 113d (step #206) so that the C-MOSs of the I/O circuits 122 through 126 will serve as pull-up resistors.

Accordingly, if a film cartridge D has been loaded in the film supply chamber, the potential at the DX data terminals 102 through 106 will be such that low levels appear at the terminals grounded through the terminal 41 and high levels appear at the remaining terminals. Those DX data are read and temporarily stored in a register R1 (not shown) after a lapse of several milliseconds of waiting time during which the potentials at the terminals 102 through 106 are expected to become stable (step #212). At step #214, the DX data are read again and the newly read DX data are compared with the DX data read before and stored in the register R1 (step #216) When both data are not equal to each other, it is determined that the data have been erroneously read. Then, the operation returns to step #212 wherein the DX data read last is tentatively stored in the register R1 and the above mentioned process of re-reading and comparison is repeated. If it is determined at the step #216 that both data are equal to each other, this means that the same data are read twice successively. Hence, it is assumed that the DX data has been correctly read, and the operation proceeds to step #218 wherein the read data is finally stored in another register R2 (not shown). Then, "0" is written in the register 113b and the operation returns from the subroutine The "0" of the register 113b makes the outputs of the I/O circuits 122 through 126 at low levels to disable the pull-up resistors to prevent the leakage of current while any of the terminals 42 through 46 are grounded through the DX code contacts on the film cartridge. Thus, the pull-up resistors are controlled such that electric current flows only at the time of DX data reading, and that current leakage is prevented other times, thereby contemplating energy saving.

The following explanation concerns the case wherein the potential at the terminal 107 is at a low level at the step #202. At step #240, "0" is set in the register 113a so that the I/O circuit 126 outputs the content of the register 113c. At that state, the content of the register 113c is changed from "0" to "1" at step #242 and then changed from "1" to "0" after a lapse of time t0, e.g. 5 msec. Thus, a timing signal CALOK, having a pulse width of t0, is output from the terminal 106 to the external instrument B. At step #244, "1" is written in the register 113d to unblock the AND gate 152 and initiate the supply of clock pulses φ1 to the counter 151 and the shift register 114. Simultaneously therewith, the same clock pulses φ1 are supplied to the external instrument B through the I/O circuit 124, the terminal 104 and the contact 44 to start the serial data exchange between the camera body and the external instrument B. Then, "1" is set in the flag F1 at step #246 to signify that the microcomputer is in the camera data reading state of operation, "1" is set in the flag F2 at step #248 to mean that the first byte of the signal is being exchanged, and the microcomputer is conditioned at step #250 to accept the serial data exchange interrupt signal. Then, the operation returns from the subroutine. It is to be noted that the first byte of the serially exchanged data is a kind-of-data designating signal CAL COMMAND supplied from the data selector section 22 of the external instrument B, and that the microcomputer 110 interprets the command signal and outputs various data in accordance therewith as described below.

At the time when the operation returns from the step #250 of the subroutine to the main routine of FIG. 4, the first byte of data, i.e. the kind-of-data designating signal is being transmitted. When the transmission of the first byte of data is terminated during the operation of the main routine being performed, the output of the counter 151 changes from a high to a low level. The change of the output level is transmitted to the microcomputer 110 as a serial interrupt requesting signal. At the same time, the register 113d is automatically reset to block the AND gate 152 and stop the supply of the clock pulses φ1. In response to the serial interrupt requesting signal, the microcomputer 110 jumps to the serial interrupt processing routine shown in FIG. 6.

In the serial interrupt processing routine, the content of the flag F2 is first checked at step #300. If the content of the flag F2 is "1", the program flow jumps to step #310. If the content of the flag F2 is "0", the program flow jumps to step #400. As the "1" of the flag F2 means that the transmission of the first signal byte has been completed, the data of the first byte is read at step #310 from the shift register 114 and is stored at step #320 in a register R3 (not shown), and the content of the first bite data is interpreted at step #330. At step #340, the number Ni of the byte of the output data in accordance with the interpretation is set in a data counter (not shown). The leading portion of the address ai of the RAM where the data to be output is stored, is set in an address pointer (not shown) at step #350, and the flag F2 is set to "0" at step #360. At step #370, the data in the address indicated by the address pointer R5 is derived and written in the shift register 114 (step #380). After "1" is set in the register 113d at step #390, the program flow returns from the interrupt subroutine. The "1" written in the register 113d starts the serial data transmission of the second data byte between the external instrument B and the camera body in the same manner as described above.

Upon completion of the second data byte transmission, the serial interrupt requesting signal is generated again and the microcomputer 110 performs the process of the serial interrupt routine again. As the flag F2 is "0" at this time, the microcomputer 110 jumps from the step #300 to step #400. In the routine starting at the step #400, data stored in the microcomputer 110 are supplied to the external instrument B in accordance with the designation by the first data byte. At step #400, the content N in the data counter is checked. If the content N is not "0", the operation proceeds to step #410. If the content N is "0", the operation jumps to #490. In the case, the content N of the data counter is not "0", the content N of the data counter is decremented at step #410, the data stored in the address indicated by the address pointer R5 is derived at step #420, and is written in the shift register 114 at step #430. At step #440, "1" is written in the register 113d to initiate the serial data transmission as described before so that data are supplied successively from the register 114 through the terminal 105 and the contact 45 to the external instrument B. At step #450, the content of the address pointer R5 is incremented to renew the data address, and the operation returns from the interrupt routine.

With the above described operations, data are serially output in accordance with the command by the signals input from the external instrument B. When the serial interrupt-requesting signal is generated upon completion of the outputting of the Ni number data, the content N of the data counter has become "0". so that the operation jumps from step #400 to step #490. At step #490, "0" is written in the register 113b and "1" is written in the register, 113a, the outputs of the I/O circuits 122 through 126 are forcedly fixed to low levels to terminate the sequence of the camera data reading operation.

In the subroutine 1 of FIG. 5, when the potential at terminal 107 is a low level, the operation immediately jumps to step #240 to perform the camera data reading operation. However, the subroutine may be designed such that the camera data reading operation starting at step #240 is executed after the DX data reading operation from step #204 to step #220 is executed at least once.

Figure 8:
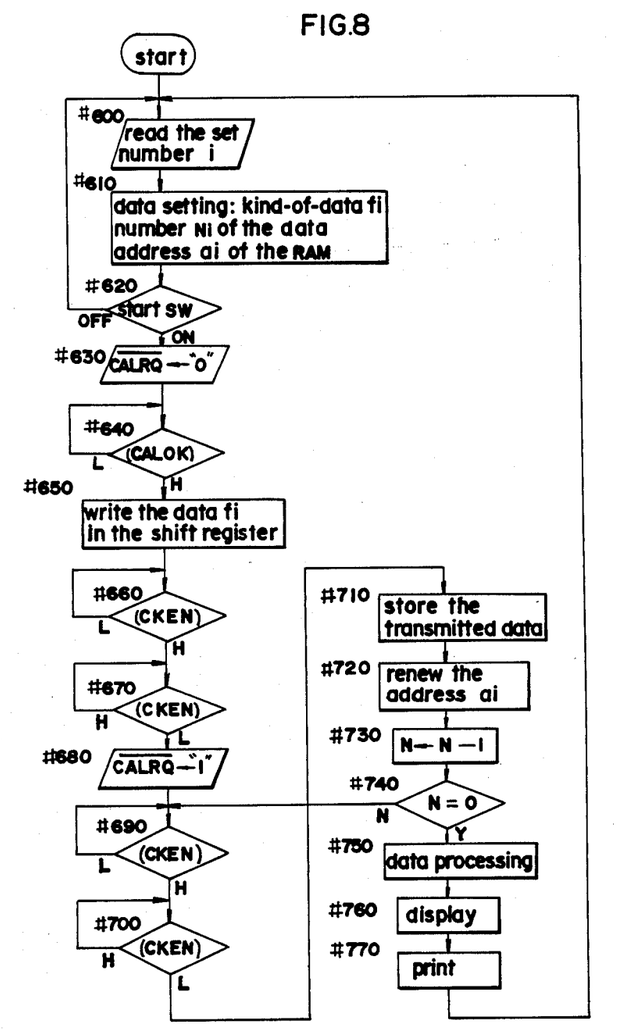
FIG. 8 is a flow chart showing the operation of the microcomputer 210 shown in FIG. 3.

FIG. 8 is a flow chart showing the operation of the microcomputer 210 in the external instrument B. It is assumed that the selector switch 211 is set to the setting position of number i (i=1–3 in the embodiment of FIG. 3). First, the number i of the set position selected by the selector switch 211 is read through the input port 213 (step #600). At step #610, a kind-of-data designating data fi corresponding to the set number i is output in the form of eight-bit data. As the data belonging to the kind-of-data, the number Ni of the byte of the data to be output from the camera body is set in a register R6 (not shown). The leading portion of the address ai of the RAM storing those data is set in a register R7 (not shown). At step #620, the signal representing the state of the start switch 212 is read through the input port 213. If the start switch 212 is not operated, the operation returns to step #600. If the start switch 212 is operated, e.g. depressed, a low level signal is output at the output port 215 (step #630), and the microcomputer 210 waits until the input to the terminal 216 changes to a high level (step #640) As the low level signal from the output port 217 is applied to the terminal 107 of the data I/O device A of the camera body, the microcomputer 110 of the camera body starts the data reading operation starting at the step #240 in FIG. 5, and outputs from the terminal 106 a timing signal CALOK which is at a high level for the period of the pulse width of t0 milliseconds. In response to the signal CALOK, the microcomputer 210 of the external instrument B proceeds to step #650 in FIG. 8 to write in the register 214 an eight-bit kind-of-data designating data fi and waits while the input CKEN to the terminal 203 changes from a low, through a high, to a low level (step #660–#670). As the content of the register 113d of the data I/O device A in the camera body becomes a high level only during the period of the serial input and output of eight-bit data, the kind-of-data designating data fi is to be read in the camera body while the input CKEN to the terminal 203 changes from a low, through a high, to a low level. In response to the reading of the data fi, the microcomputer 210 of the external instrument B returns the potential at the output port 215 to a high level (step #680).

Then, the microcomputer 210 waits until the input CKEN to the terminal 203 changes form a low, through a high, to a low level (step #690 #700). In this case, while the potential at the terminal 203 is high, eight-bit camera data is serially transmitted to the external instrument B by the flow starting at the step #310 in FIG. 6, in the opposite way to that of the operation of the steps #660 to #670. Then, the camera data transmitted to the shift register 214 of the external instrument B is stored at the address ai of the RAM indicated by the address pointer R7 (step #710).

Subsequently, the content of the address pointer R7 is incremented at step #720, and the content N of the register R6 is decremented at step #730. At step #740, it is determined whether the decremented value N is "0" or not. If the decremented value N is not "0", this means that data are further supplied from the camera and the operation returns to step #690 to wait for the arrival of the next data.

Thus, the loop of #690 → . . . →#740–#690 is repeated at each time of data transmission from the camera body, until the value N becomes "0" whereupon the operation jumps to step #750. At this time, the camera body completes the outputting of data of the number Ni of bytes designated in accordance with the kind-of-data which is designated by the kind-of-data designating data fi. At step #750, a desired data processing is executed with the data input from the camera body to the external instrument B. The result of the data processing is displayed on the display section 26 in FIG. 1 (step #760) and is recorded by the printer 28 (step #770). Thus, the sequential data reading operation is completed, and the operation returns to step #600.

When it is desired that another kind of data is read from the camera body, the selector switch 211 may be set to a position corresponding to the desired data and the start switch 212 may be operated so that similar operation as described above is effected and the desired data is obtained.

Figure 9:
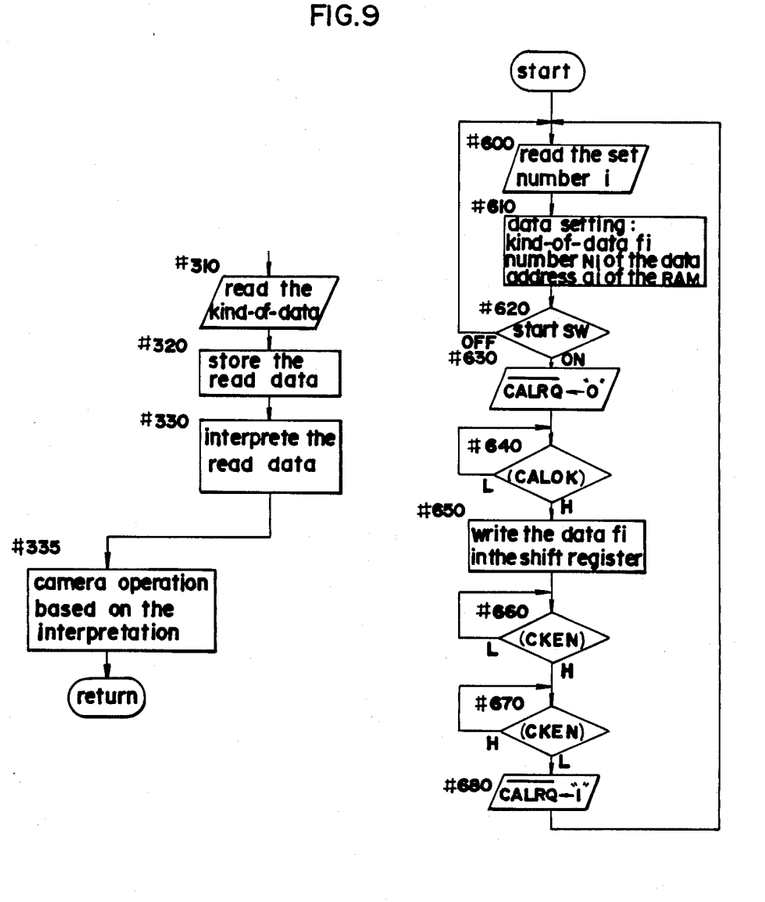
FIG. 9 is a flow chart showing an embodiment wherein the flows of FIGS. 6 and 8 are modified partially.

The above mentioned embodiment may be modified such that the external instruments make the microcomputer 110 of the camera body perform any desired operations, such as light measuring, exposure calculation, automatic exposure control, automatic focusing, film feeding and other operations, rather than read the operation checking data from the camera body. To this end, the kind-of-data designating data of the external instrument B may be changed to a data designating the desired camera operation, and the microcomputer of the camera body may be designed to make the designated operation in response to the camera designating data operation, instead of outputting the operation check data. For that purpose, the aforedescribed flow shown in FIGS. 6 and 8 may be modified as shown in FIG. 9 wherein the camera program has a step #335 for effecting a camera operation in accordance with the result interpretation at step #330, instead of the steps #340 through #390, while the microcomputer 210 program flow of the external instrument B may jump from step #680 to step #600.

Additionally, the embodiment may be modified such that circuits in the camera body may be checked in place of the camera operations being checked. Further, the embodiment may be designed to selectively effect the reading of the data check, camera operation check and camera circuit check.

In the above embodiment, the terminal 107 is arranged separately from the DX contact terminals C due to the number of terminals for the DX data. Instead, the terminal 107 may be located in the vicinity of the DX contact terminals C. Otherwise, the terminal 107 may be located under a name plate or the like which is detachably attached to the outer surface of the camera body by fastening screws or adhesion, such that the terminal 107 may be used in the assembly, adjustment and repair of the camera. The terminal 107 may be included in the group of terminals for the DX data if there is room in the number of terminals for the additional terminal For example, although the above-mentioned embodiment is provided with the input and output terminals separately for the serial data transmission, a single terminal may be provided for both purposes, with a circuit for selecting the inputting and outputting being provided. Then, the terminal 107 may be included in the DX terminals.

Figure 10A:
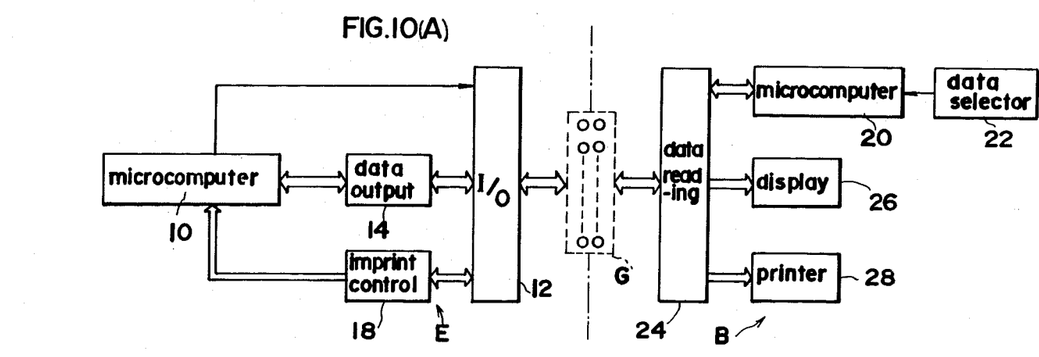
Figure 10B:
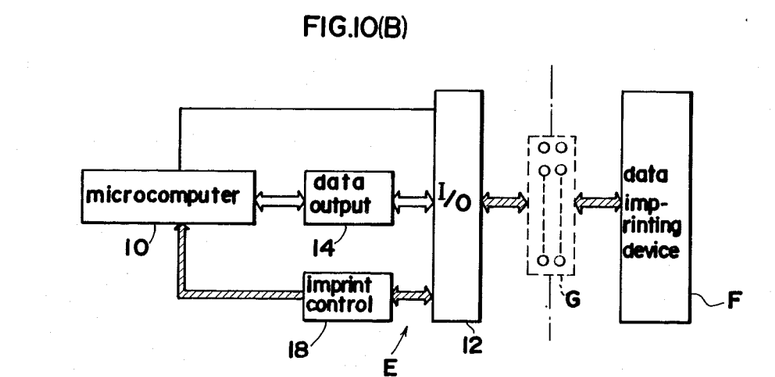

In the above embodiment, the camera check data are exchanged through a group of DX terminals of the camera body, but terminals for such data exchange should not be restricted to the DX terminals, but other terminals such as the terminals for data exchange with the photographic accessory such as a data imprinting device, an electronic flash device and a motor driving device may be used In the following, is described the case wherein the camera checking data are exchanged through a group of terminals for a data imprinting device. With reference to FIG. 10-A which is a block diagram similar to that of FIG. 1, a data imprinting control section 18 is provided in the data I/O device E, in place of the DX data reading section 16 in FIG. 1. The data imprinting control section 18 is a bi-directional circuit which, when the imprinting device F shown in FIG. 10-B is coupled to the camera body through the group of terminals, transmits to the data imprinting device F imprinting control data such as a film speed signal, an imprinting light amount control data and an imprinting initiating signal. The data imprinting control section 18 transmits to the microcomputer 10 of the camera body camera control data, such as exposure control data calculated or set in the data imprinting device F, and a shutter release signal. Those imprinting control data and camera control data are exchanged through the route shown by hatching in FIG. 10-B. The data imprinting control section 18 is also used for the exchange of camera data with the external instrument B as in the case of the DX data reading section in the above described embodiment. The operation for that case is the same as that of the above-described embodiment and its explanation is not repeated.

As many apparently widely different embodiments of this invention may be made without departing from the spirit and scope thereof, it is to be understood that the invention is not limited to the specific embodiments thereof except as defined in the appended claims.

What is claimed is:

1. A camera, comprising:
   at least one electrical terminal for contacting at different times a film cartridge and a reading device;
   switching means having a first state and a second state;
   means for reading an exposure code from said film cartridge through said electrical terminal when said switching means is in said first state;
   digital means responsive to said reading means for controlling photographic operations; and
   means for impressing upon said electrical terminal a digital signal derived from said digital means when said switching means is in said second state.

2. A camera as recited in claim 1, wherein said digital means includes means for providing exposure data and wherein said digital signal comprises said exposure data.

3. A camera as recited in claim 1, wherein said at least one electrical terminal comprises a plurality of terminals.

* * * * *